United States Patent [19]

Kahn

[11] 4,205,202
[45] May 27, 1980

[54] METHOD AND MEANS FOR IMPROVING THE SPECTRUM UTILIZATION OF MULTICHANNEL TELEPHONE SYSTEMS

[76] Inventor: Leonard R. Kahn, 70 N. Grove St., Freeport, N.Y. 11520

[21] Appl. No.: 870,330

[22] Filed: Jan. 18, 1978

[51] Int. Cl.² .............................................. H04J 3/10
[52] U.S. Cl. .......................................... 370/81; 370/6
[58] Field of Search ........... 179/15 AS, 1 VC, 170 E, 179/15 AN

[56] References Cited

U.S. PATENT DOCUMENTS

| | | | |
|---|---|---|---|
| 3,891,806 | 6/1975 | Chatelon et al. | 179/15 AN |
| 4,113,987 | 9/1978 | Samuelsson | 179/15 AN |

FOREIGN PATENT DOCUMENTS 2702497  8/1977  Fed. Rep. of Germany ..... 179/15 AN

Primary Examiner—Thomas A. Robinson

[57] ABSTRACT

A system and method for improving the spectrum utilization of voice communications channels by increasing the number of voice conversations a given number of lines can service. This invention can be used to improve the reliability and efficiency of conventional TASI (Time Assignment Speech Interpolation) systems and allow such systems to provide good performance when utilizing a mixture of types of telephone lines; including, microwave, cable, and satellite, and two wire configuration lines.

5 Claims, 4 Drawing Figures 4,205,202

METHOD AND MEANS FOR IMPROVING THE SPECTRUM UTILIZATION OF MULTICHANNEL TELEPHONE SYSTEMS

RELATED APPLICATION

This application is related to my co-pending application filed July 18, 1977, Ser. No. 816,661, entitled, "Method and Means for Improving the Spectrum Utilization of Communications Channels".

BACKGROUND OF THE INVENTION

While features of the invention are subject to a wide range of applications, the invention is especially suited for use in TASI (*Time Assignment Speech Interpolation*) systems and will be particularly described in that connection.

TASI systems have been used to improve the utilization efficiency of voice communications systems by reducing the time that telephone lines are temporarily idle. For example, in a conventional two-way telephone circuit, over 50% of the line's capacity is wasted, accommodating the listener's transmit channel.

The TASI system constantly monitors speech channels and quickly reassigns lines from idle channels to active channels increasing the overall efficiency of the system. TASI systems have been described in the literature; for example, K. Bullington and J. M. Fraser, "Engineering Aspects of TASI", BSTJ, Vol. XXXVIII, March 1959, and "Transmission Systems for Communications" Bell Telephone Laboratories, 1970, pages 682 to 684 including references.

In the conventional TASI system, separate line(s) are used for transmitting channel assignment information, although systems have been described wherein the initial channel assignment information is transmitted via the line assigned to transmit the channel.

It is noteworthy that the telephone communications network systems utilize a multiplicity of transmission systems; including, wire line, wideband cables, Satellite links, microwave radio links, etc., and that the time delay characteristics of these transmission systems substantially differ. Such significant differences in delay can cause degraded control performance of a TASI system when, say, long time delay lines are used in transmitting control information of short time delay lines. Also, failure of a line transmitting control information can cause a large number of circuits to improperly perform. Thus, a conventional TASI system may be subject to poor operation and simultaneous interruption of a number of conversations if it utilizes a common control line.

If TASI systems utilize the assigned line to transmit the initial channel assignment information, the problem of a difference in time delay between the line carrying the voice signal and the line carrying the control information is eliminated except for poor timing of the line disconnect system. Also, since conventional TASI systems transmit information regarding channel assignment status and idle line status over a separate line, these systems are subject to performance degradation when the control line becomes inoperative. Of course, spare lines can be provided, but at a loss in line utilization efficiency. Furthermore, if a line carrying a telephone signal fails in such systems, a conversation is interrupted until the call is reassigned.

SUMMARY OF THE INVENTION

A general object of the instant invention is to provide means for improving the spectrum utilization of communications channels.

A further object is to improve the operating efficiency of a TASI type system. Another object of the invention is to allow the use of a mixture of telephone lines having appreciably different time delay characteristics to be used in a TASI type system. Also, this invention allows TASI systems to be used with two wire lines. An additional object of this invention is to convert intelligible crosstalk into unintelligible crosstalk.

A further object of the instant invention is to improve the reliability of the control circuit sensitivity of a TASI type system. A still further object is to provide a system that may be constantly monitored and cause inoperative lines to be automatically removed from operation and alarm circuitry automatically activated.

The present invention provides improved telephone line utilization efficiency for multi-channel telephone systems and in one embodiment utilizes the following method steps:

1. Sensing the speech activity of a telephone channel.
2. Selecting a line from a group of inactive lines for transmitting the speech wave sensed in Step (1), and subsequently connecting the speech wave to the selected line.
3. Rapidly transmitting (in approximately 10 milliseconds) the initial channel identification information over substantially the entire bandwidth of the selected line to the remote end of the line; and,
4. Transmitting continuous channel verification information in a narrowband slot in the passband of the line concurrently with the transmission of the speech wave.

In one embodiment of the invention the narrowband slot of Step (4) has a bandwidth of approximately 300 Hz and one preferred arrangement would be to have the slot fall between approximately 2,000 and 2,300 Hz.

An added arrangement of the invention would be used to implement the TASI type system wherein two wire transmission line configurations are used. In such applications there is possible degradation of performance caused by imperfect separation at the junction between two wire and four wire lines. In one embodiment of the invention the speech is encoded in one speech direction differently than it is encoded in the other direction. It is necessary to decode the speech at the receive or far ends of the system in order to restore intelligible speech. The overall object of this procedure is to render crosstalk unintelligible so that the crosstalk is less disturbing and privacy is maintained.

In some systems, encoding would be provided only for speech going in one direction. Thus, encoding equipment would only be supplied for the transmitting end and the receiving end at the far end of the circuit. Such a system could utilize frequency inversion at the transmit end of the circuit. In order to restore the intelligibility of the speech it would be necessary to supply a complementary frequency inversion at the far end receive circuit.

For a better understanding of the present invention, together with other and further objects thereof, reference is had to the following description, taken in connection with the accompanying drawings, while its scope will be pointed out in the claims.

DESCRIPTION OF THE PREFERRED EMBODIMENT

Figure 1:
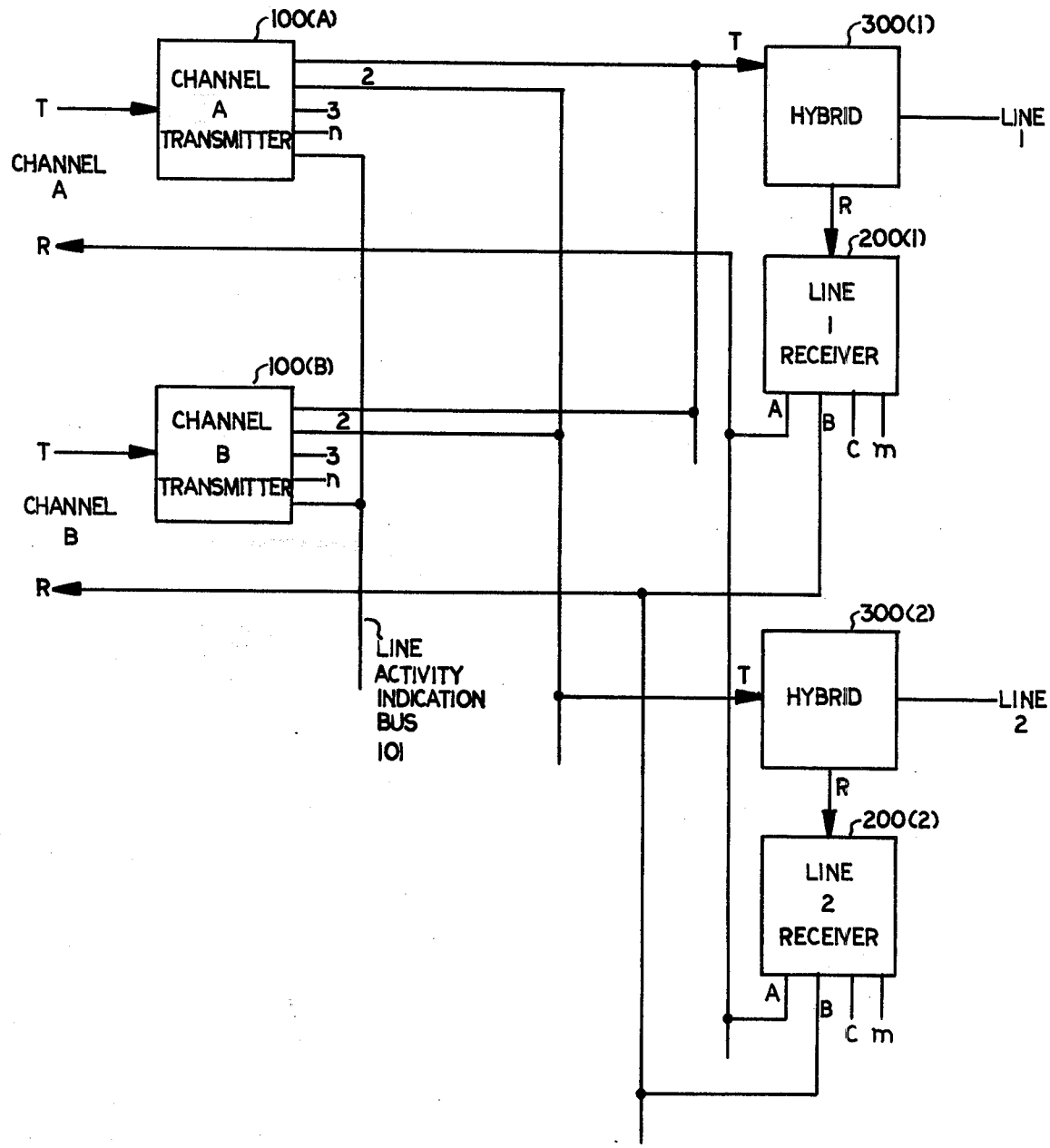
FIG. 1 shows a block diagram of one embodiment of the invention.

FIG. 1 shows a simplified block diagram of one end of a system using an embodiment of the invention.

Figure 2:
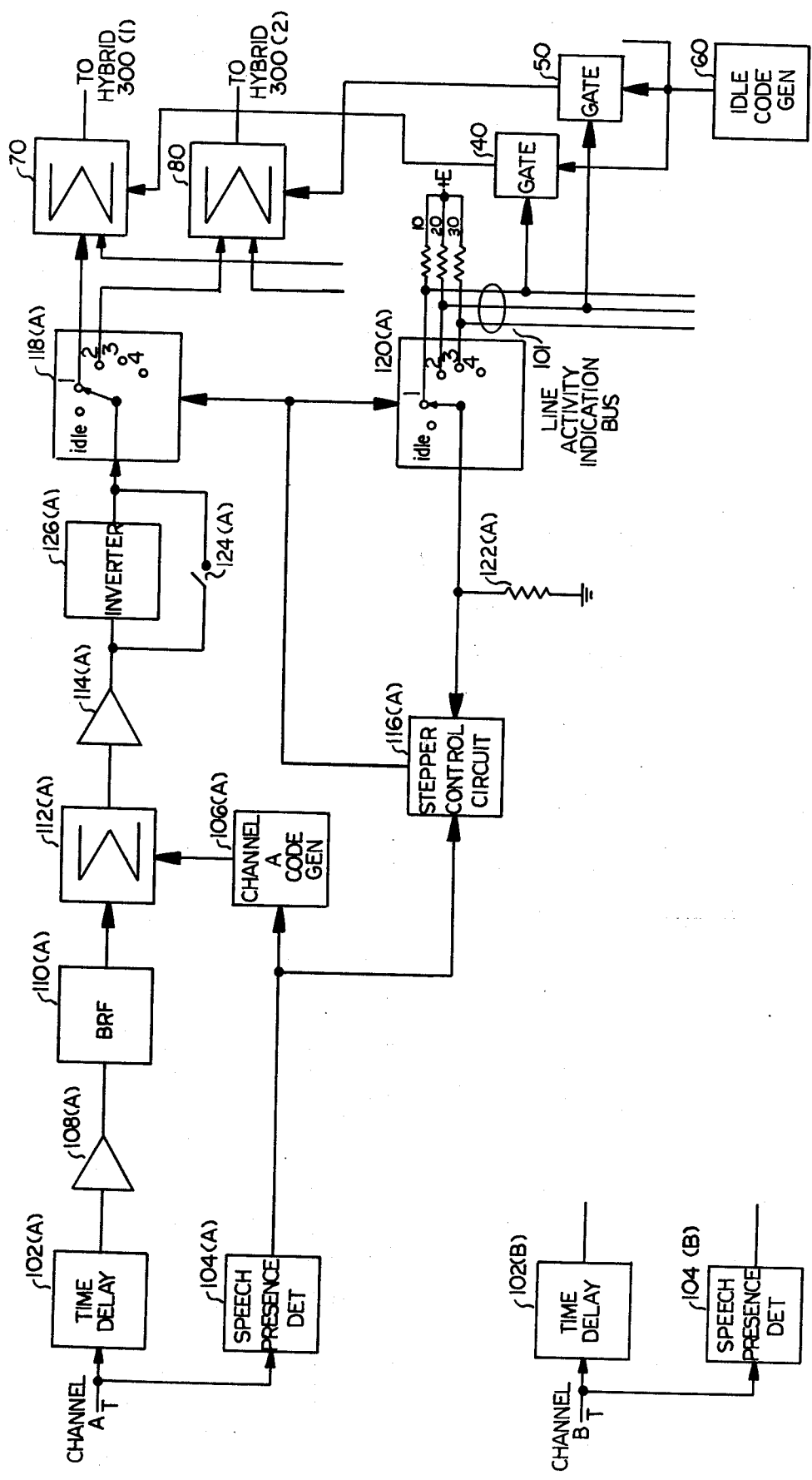
FIG. 2 shows, in block and schematic form, the talk or transmit end of the invention.

The T line, or talk line, feeds block 100(A) the Channel A transmitter. Each channel transmitter incorporates circuitry for locating an unused transmit line, switching circuitry for connecting the channel to any one of the available lines and a channel identification wave generator. Details of the channel transmitter circuitry are shown in FIG. 2, and description of this equipment, as well as the idle signal generator circuitry, is provided below.

The output lines of the channel transmitters are connected through summation circuits, not shown, to line hybrid circuits which are used for isolating the talk and listen signals when two wire lines are used. Hybrid transformers are commonly used for providing such isolation. Unfortunately, it is difficult to achieve and maintain high degrees of isolation.

It is an important advantage of the present invention that it reduces the effects of poor talk-listen isolation. For detailed discussions of hybrid circuits, two wire and four wire lines, one can consult a number of publications dealing with telephony, including the above cited book "Transmission Systems for Communications", written and published by Bell Telephone Laboratories, 4th Edition, 1970.

In order to reduce the deleterious effects of crosstalk caused by imperfect hybrid circuits or other imperfections, the transmitter at one end of the circuit may be equipped with encoding devices such as a frequency inversion system, and at the other end a compensating frequency inversion system is incorporated into the receiver.

Figure 3:
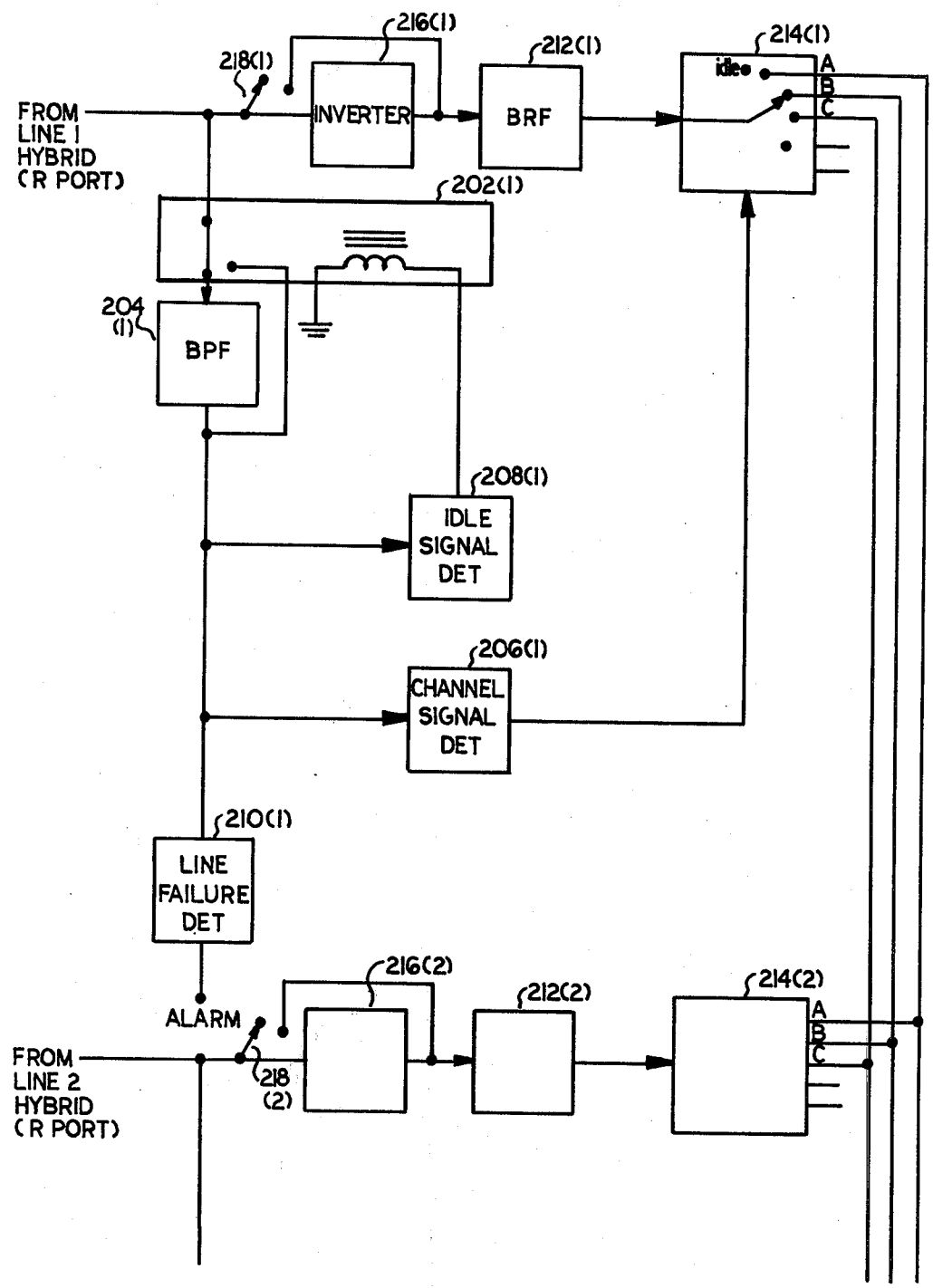
FIG. 3 shows, in block and schematic form, the listen or receive circuitry of the invention.

Each of the n lines feeds a line receiver which includes means for decoding the m channel (m is greater than n) identification waves and using the decoded information to switch the received speech wave to the assigned channel. Also included in the receiver is circuitry for activating an alarm if the line fails. FIG. 3 as described below, shows details of the line receiver.

Also shown in FIG. 1, is the line activity indicating multiwire bus 101 which provides information to the various channel transmitters allowing the transmitter to make proper line assignments.

As shown in FIG. 1, hybrid circuit 300(1) feeds the line receiver, and isolates the receive signal from Channel A transmit signal.

FIG. 2 shows one type of transmitter suitable for implementation of this invention. The Channel A T, talk circuit, feeds speech presence detector 104A. This speech detector may utilize various type circuits, including the type disclosed in U.S. Pat. No. 3,337,808. The control voltage produced by speech detector 104A feeds stepper control circuit 116A. On the initiation of a speech presence indication from 104A, stepper control 116A causes switches 118A and 120A to start stepping from one switch position to another until an idle talk line is located.

One possible procedure for locating an idle line is shown in FIG. 2. Switch 120A, as well as 118A, is preferably an electronic switching circuit and may use integrated circuit gates. For simplicity of explanation, a mechanical type switching circuit is shown. Actually, some equipment designers may prefer to use mechanical switches. However, for rapid operation, electronic switches are preferred. Each contact of the switch assigned to a line is connected through a resistor to +E volt point. For example, the contact representing line 1 is connected to +E through resistor 10, and the contact representing line 2 is connected to +E through resistor 20, etc.

The arm of the switch is returned to ground through resistor 122A. It should be noted that the resistors 10, 20, 30, etc. are connected in common with all of the channel transmitter's switches 120A to N. Therefore, if line 1 is in use, the channel using line 1 connects its resistor 122 to resistor 10 reducing the voltage appearing at the contact side of resistor 10. This reduced voltage is sensed at all channel 120 switches, causing any stepper circuit in operation to continue to step past the line 1 position. When, say, 120A switch is caused to step to the line 2 position, which, for example, is idle in the talk direction, the voltage sensed across resistor 122A would be substantially higher than when switch 120A was in the line 1 position. For example, if resistors 10, 20, 30, etc. are 10,000 ohm resistors, and 122A to N are 1,000 ohm resistors, and +E is 10V, there would be 0.909 volts across resistor 122A in the line 2 position, and 0.476 volts across resistor 122A in the line 1 position.

These differences in voltage allow the stepper circuit to stop the line switch in the first inactive position. In addition the voltage differences control the transmission of the idle signal over the temporarily idle lines.

The line associated 120 contacts are connected together by line activity indication bus 101.

Stepper control circuit 116A also controls the signal switching circuit 118A. Accordingly, if switch 120A stops at line 1, so does switch 118A connecting the signal circuit to line 1. The voice signal from Channel A talk circuit is processed as follows:

The voice wave appearing on the Channel A T line, besides feeding the speech presence detector 104A, feeds time delay circuit 102A. This circuit delays the speech wave so as to allow some time for the channel assignment circuitry to operate at the far end of the circuit. A time delay in the order of 10 to 20 ms would be required for typical installations.

For these values of time delays, the equipment designer has the choice of using mechanical magnetic tape time delay loops or solid state time delay circuits. For high reliability performance, solid state charge coupled integrated circuits are a good choice. Such devices as the SAD-1024 analog delay line as manufactured by the Reticon Corporation of Sunnyvale, California, are available for such applications.

The time delay circuit serves two purposes.

(a) It delays the voice signal so that little or no initial speech sounds are lost after speech presence is detected and while the channel/line assignment is being established and, (b) It avoids the transmission of speech during the transmission of the high speed channel identification signal reducing the probability of errors in connecting lines to the proper channel utilization circuit.

It is possible to delete the time delay circuit, but, in this case, a gating circuit should be provided in order to gate the speech wave off during the transmission of the initial identification signal so as to avoid causing channel switching errors. Also, if time delay circuits are not provided, a finite clipping of initial voice signals will be suffered.

The output of time delay circuit 102A is amplified, if necessary, in amplifier 108A, which, in turn, feeds band reject filter 110A. This filter cuts a narrow slot in the passband of the voice signal in order to provide spectrum space for the narrowband channel identification signal. In a prior patent, U.S. Pat. No. 3,684,838, it was disclosed that a cut of 200 or 300 Hz at preferably the mid-upper range of the telephone transmission channel did not materially degrade quality or intelligibility of speech waves. For example, a band reject filter which substantially attenuates speech components between 2,000 and 2,300 Hz would be suitable for this application. The output of filter 110A feeds summation circuit 112A. Also feeding summation circuit 112A is Channel A code generator 106A. This generator produces two types of identification waves;

(a) a high speed channel identification wave which may use substantially the entire line's bandwidth, typically between 400 and 2,700 Hz, and (b) a narrowband channel identification wave which must fall within the slot produced by band reject filter 110A, for example, 2,050 to 2,250 Hz.

As to the type of identification wave used, the designer may use any of the numerous signalling methods; such as, on/off keying, frequency shift keying, and phase shift keying.

Such systems are detailed in numerous publications; for example, W. R. Bennett and J. R. Davey, "Data Transmission", McGraw-Hill, New York, 1965. The code generator, when initially sensing speech presence from the control voltage produced by speech presence detector 104A, produces a high speed Channel A identification signal. This signal would require approximately 10 ms for transmission, and would start some 2 ms after speech is detected by detector 104A. The 2 ms interval is provided to allow the idle line locator to select an idle line.

There are numerous code generators available to the designer. For example, the book "Digital Integrated Electronics", H. Taub and D. Schilling, McGraw-Hill, New York, 1977, in Chapter 10, discusses equipment useful for such purposes and also provides design information.

It is possible to use a single code for both the high speed and narrowband channel identification waves and merely slow down the readout speed by reducing the clock frequency when transmitting the narrowband wave. It is desirable to simultaneously shift the carrier frequency of the keyed wave to be sure to center the keyed wave in the passband of the narrowband filter when transmitting the narrowband identification wave from a frequency centered in the line passband for the high speed transmission.

When the transmission of the high speed channel identification signal is completed, the Channel A code generator initiates transmission of the narrowband Channel A identification wave, which continues until the speech detector 104A indicates that the local A speech channel has been idle, for, say, 300 ms. At that time the associated line is disconnected from Channel A and generator 106(A) can cease operation.

When Channel A talk circuit is idle, line 2 should, during high traffic activity conditions, be freed for service with other channels. The disconnecting of line 2 from Channel A is accomplished as follows:

The speech presence detector 104A will produce a no signal indication voltage which will, after, for example, 200 to 300 ms, cause stepper control circuit 116A to control switching circuits 118A and 120A to switch to their idle positions. Thus, Channel A is disconnected from line 2.

It is advantageous that means be provided for monitoring the availability of lines at all times. Accordingly, additional circuitry is provided for transmitting an idle code signal whenever a line is unassigned.

This continuous protection is provided by using the rise in voltage whenever all of the arms of the various 120 switching circuits are disconnected from the line activity sensing resistors 10, 20, 30, etc., to control associated gates. For example, if line 2 becomes inactive, the voltage at the switch contact end of resistor 20 rises. This increased voltage is sufficient to close gate 50 passing the idle code wave generated in generator 60 to summation circuit 80. When line 1 is idle, the idle wave passes through gate 40 to summation circuit 70. Thus, means are provided to insure constant monitoring of the lines' condition. The idle signal may have characteristics similar to the narrowband channel identification waves.

The output of summation circuit 112A is amplified in amplifier 114A. The output of amplifier 114A is fed to a conventional frequency inverter circuit 126A for transmitters at one end only of the system. The frequency inversion converts high audio frequency components to low frequency and vice-versa. By this procedure, crosstalk signals are made unintelligible.

Thus, by this procedure, the "talk" waves going in one direction are unintelligible to local "listen" paths. Also, as will be discussed in the section treating FIG. 3, the receiver inverts the desired receive speech wave and accordingly causes any local talk crosstalk speech sounds due to the hybrid circuit unbalance to be unintelligible. Since unintelligible crosstalk is normally less disturbing to conversations, this is a major feature of the invention. Furthermore, because the present system will often be used to improve the performance of telephone communications in a single organization, where many users of the telephone facilities would be most disturbed if co-workers were able to hear their conversations, the elimination of intelligible crosstalk is a most significant advantage of the system.

It should be noted that since the frequency inversion system is a complementary transformation, it is important that frequency inversion should be used in the talk circuit at only one end of the system. For example, if, in an East/West system, the talk frequency inversion is provided for the East talk circuit, none should be provided in the West talk circuit and frequency inversion be applied only to the West receive circuit.

Details of one type of frequency inversion circuit are discussed below in the description of FIG. 4. Switch 124(A) should be open in the East location, and closed, disabling inverter 126(A) in the West location.

It will be apparent to those skilled in the communications art that other types of speech privacy systems may be used for converting intelligible speech to unintelligible speech, including a method disclosed in U.S. Pat. No. 2,880,275.

The output of inverter 126A or switch 124A feeds line switching circuit 118A to the selected line's hybrid circuit causing Channel A speech wave to be transmitted to the far end of the circuit. The other channel waves are processed in the same manner by their channel transmitters.

If a gate is used in lieu of time delay circuit 102A, or if an insufficient length delay circuit is used, the gate circuit can be controlled by speech detector circuit 104A or by an idle contact of switch 120A.

FIG. 3 shows the details of the receive or listen equipment. As is true of the transmit circuits, two receive circuits are assigned to each line used; one, at say the East end, and one to the West end. The basic task of the receive unit is to decode the transmitted channel/line assignment coded wave and accordingly switch each line to its assigned channel. Another basic function of the receivers at one end of the system is to frequency invert the previously inverted speech wave to restore intelligibility. Another important task of one preferred receiver embodiment is to continuously monitor the availability of the lines so as to cause prompt alarm activation if a line becomes unavailable.

Referring to FIG. 3, the receive port of the line 1 hybrid circuit feeds bandpass filter 204(1) through the arm of relay 202(1). The relay is shown in the position proper for reception of either a narrowband channel identification wave or an idle channel signal. The output of filter 204(1) selects the narrow signal wave in the range of; for example, say 2,000 to 2,300 Hz, and attenuates the speech components falling below, 2,000 Hz and above 2,300 Hz. Filter 204(1) feeds channel signal detector 206(1). The channel signal detector decodes the channel assignment signals and provides a control signal for the switching circuit 214(1). Switch 214(1) connects the received voice wave from line 1 to the assigned channel. The example illustrated in FIG. 3 is that of line 1 connected to Channel B.

Also connected to the output of filter 204(1) is idle signal detector 208(1). When the idle signal detector receives an idle signal two effects are caused to occur. First, switch 214(1) disconnects line 1 from whatever channel it had been connected to and switches the signal path to the idle or off position. And the second effect is the operation of relay circuit 202(1) which switches the signal input from filter 204(1) to directly feed channel signal detector 206(1). Thus, the channel signal detector is fed the entire incoming channel bandwidth rather than a small frequency segment.

Accordingly, the receiver is ready to receive a wideband, high speed channel identification signal.

Thus, the receiver is designed to recognize the presence of three types of control signals; i.e., (a) the high speed channel assignment signal,
(b) the narrowband channel assignment signal, and
(c) the idle signal.

Since at least one of the above signals is always transmitted, absence of all of them activates line failure detector 210(1), which in turn energizes an alarm circuit. The line failure circuit, instead of detecting the 3 signals directly, may be connected to detectors 206(1) and 208(1), in order to determine if a control signal is present.

It should be noted that in addition to its use in the line failure indication system the narrowband channel assignment signal allows the line to switch to the desired channel when there is an error in transmission of the high speed channel assignment signal. While such an error will cause the loss of some of the speech wave, the channel will be eventually connected. For a typical narrowband signal, instead of 10 ms, it will take approximately 100 ms to establish the circuit.

The input line also feeds a frequency inverter, which is used to restore intelligibility of inverted speech waves.

If the receiver is located at the end of the circuit not requiring frequency inversion, switch 218(1) is switched to the bypass position, disabling the frequency inversion. The speech wave is then passed through a band reject filter 212(1) which substantially removes the channel assignment coded signal wave from the speech wave which fall, for example, between 2,000 to 2,300 Hz. The output of filter 212(1) feeds resulting speech wave to the channel switching circuit 214(1) which in turn feeds the speech wave to the assigned channel.

Figure 4:
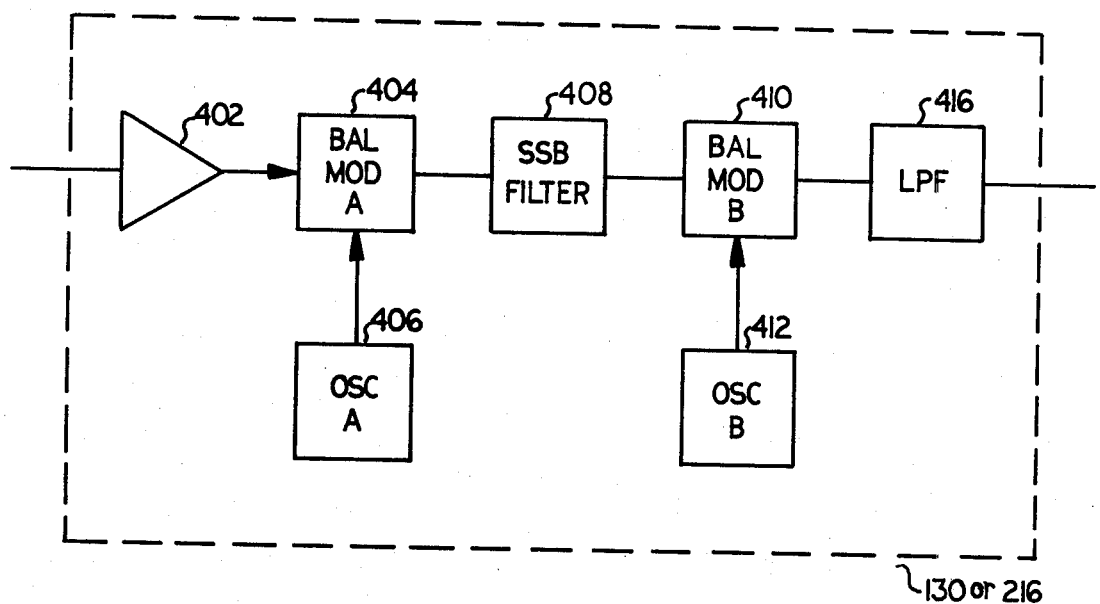
FIG. 4 is a block diagram of a frequency inverter suitable for use in one embodiment of the invention.

FIG. 4 shows one example of encoding talk signals by frequency inversion as shown in block 126.

This same circuit may be used at the other end of the system for decoding the signal by complementary frequency inversion as shown in block 216.

The speech wave is amplified in amplifier 402 which may be required to provide a more suitable level of impedance. The output of amplifier 402 feeds Balanced Modulator A 404. Also feeding Balanced Modulator 404 is Oscillator A block 406. The operating frequency of Oscillator A is selected so that one of the sidebands of the double-sideband wave produced in Modulator 404 falls in the passband of single-sideband filter 408. As an example, the oscillator can be set to 100 kHz, and for good stability should be of the crystal controlled type.

Thus, the output of Balanced Modulator A 404 is a double-sideband suppressed carrier wave centered at 100 kHz. This wave is fed to SSB filter 408, which substantially attenuates, say, the lower sideband and passes the resulting upper-sideband SSB wave to balanced modulator B 410. Balanced Modulator B is also fed by Oscillator B 412. Oscillator B operates at higher frequency in this situation, because the USB is used. A suitable frequency would be 103.3 kHz if speech waves covering 300 to 3,000 Hz are to be transmitted through lines capable of passing 300 to 3,000 Hz. The output of the Balanced Modulator would then be passed through LPF 416 so as to attenuate undesired mixing products and the 100 kHz wave. In many instances, the LPF 416 can be deleted, and other circuits, such as amplifiers and transformers with limited frequency responses can be used to provide the filtering action.

The system of FIG. 4 will translate 300 Hz waves to 3,000 Hz, 1,000 Hz waves to 2,300 Hz, and 3,000 Hz waves to 300 Hz. At the far end of the circuit, the complementary operation is performed, restoring the frequency of the speech components within the relative accuracy of the oscillator used in the system.

It will be apparent to those skilled in the applicable art that a phase shift type SSB system may be substituted in the system of FIG. 4 for the filter system shown.

In all cases, it is understood that the above described arrangements are merely illustrative of the many possible specific embodiments which represent applications of the present invention. Various changes and modifications can be readily devised in accordance with the principles of the present invention without departing from the spirit of the invention and within the scope of the following claims.

What is claimed is:

1. The method of implementing a TASI type system utilizing transmission lines of the two wire configuration comprising;
   (a) separating talk and listen signals at junctions of two wire and four wire lines and rendering crosstalk, due to imperfect separation, unintelligible by,
   (b) encoding the speech transmitted in one direction differently than speech transmitted in the other direction, and
   (c) decoding the encoded speech at the far end of the system.

2. The method of reducing the effect of crosstalk in a TASI type system, comprising;
   (a) encoding the transmitted speech (prior to transmission by a two wire telephone line carrying a TASI signal) at only one end of a circuit, and,
   (b) decoding the encoded speech at the receive end of the circuit after a hybrid circuit has separated talk and listen waves so as to substantially eliminate intelligible crosstalk.

3. The method of claim 2, wherein the encoding step is performed by frequency inversion at the transmit end of the circuit, and complementary frequency inversion is performed at the receive end of the circuit so as to restore the speech wave to its normal intelligible state.

4. A telephone system utilizing two wire type transmission lines, the improvement comprising;
   (a) means for frequency inverting speech waves generated only at one end of the communications line, and
   (b) means for restoring the proper frequency characteristics of the speech wave by frequency inverting the received wave at the far end of the line.

5. The system of claim 4 wherein the system is of the TASI type.